(12) United States Patent
Sasaki et al.

(10) Patent No.: US 11,987,274 B2
(45) Date of Patent: May 21, 2024

(54) IN-VEHICLE COMMUNICATION SYSTEM

(71) Applicant: Koito Electric Industries, Ltd., Shizuoka (JP)

(72) Inventors: Kazuya Sasaki, Shizuoka (JP); Takayuki Araki, Shizuoka (JP); Shuhei Kojima, Shizuoka (JP); Junichi Kusano, Shizuoka (JP)

(73) Assignee: Koito Electric Industries, Ltd., Shizuoka (JP)

( * ) Notice: Subject to any disclaimer, the term of this patent is extended or adjusted under 35 U.S.C. 154(b) by 452 days.

(21) Appl. No.: 17/291,472

(22) PCT Filed: Oct. 17, 2019

(86) PCT No.: PCT/JP2019/040827
§ 371 (c)(1),
(2) Date: May 5, 2021

(87) PCT Pub. No.: WO2020/110496
PCT Pub. Date: Jun. 4, 2020

(65) Prior Publication Data
US 2022/0024498 A1 Jan. 27, 2022

(30) Foreign Application Priority Data
Nov. 29, 2018 (JP) .................. 2018-223103

(51) Int. Cl.
*B61D 33/00* (2006.01)
*B60R 16/023* (2006.01)
(Continued)

(52) U.S. Cl.
CPC ........ *B61D 33/0021* (2013.01); *B60R 16/023* (2013.01); *B61D 29/00* (2013.01); *H04B 10/116* (2013.01)

(58) Field of Classification Search
CPC .... B61D 33/0021; B61D 29/00; B61D 33/00; B60R 16/023; H04B 10/116
See application file for complete search history.

(56) References Cited

U.S. PATENT DOCUMENTS 10,059,233 B2 * 8/2018 Suzuki ............... B60N 2/02246
2006/0056855 A1 * 3/2006 Nakagawa ................ G09F 9/33
398/183

(Continued)

FOREIGN PATENT DOCUMENTS

JP 2006-321352 A 11/2006
JP 2010-016575 A 1/2010
(Continued)

OTHER PUBLICATIONS

Patent Cooperation Treaty, International Search Report dated Dec. 3, 2019 for International Application No. PCT/JP2019/040827 and English Translation, 5 pages.
(Continued)

*Primary Examiner* — Ig T An
*Assistant Examiner* — Christine Nguyen Huynh
(74) *Attorney, Agent, or Firm* — Fitch, Even, Tabin & Flannery, LLP

(57) ABSTRACT

Purpose is to enable communication with a vehicle installation installed in a vehicle in a manner that facilitates implementation of a security measure and with high sensitivity and at low cost. An in-vehicle communication system includes an interior light with communication function, a seat and a display device, the interior light with communication function including a LED configured to transmit information to the seat and the display device via visible light communication, and the seat and the display device including light receiving units configured to receive information transmitted from the interior light with communication function and control units configured to control them- (Continued)

selves based on the information received by the light receiving units.

3 Claims, 6 Drawing Sheets

(51) Int. Cl.
  *B61D 29/00*   (2006.01)
  *H04B 10/116*  (2013.01)

(56) References Cited

U.S. PATENT DOCUMENTS

2017/0070288 A1* 3/2017 Ikehara ............... H04B 10/116
2018/0154799 A1* 6/2018 Lota .................... B60N 2/06

FOREIGN PATENT DOCUMENTS

JP   2011-259261 A   12/2011
JP   2016-039543 A    3/2016
JP   2016-101788 A    6/2016

OTHER PUBLICATIONS

Haiman, Ma, "High-speed railway train crewing practice", Chengdu, Southwest Jiaotong University Press, p. 89 (2016), and English translation of relevant part, 6 pages.

Zhijiang, Lan et al., "High-speed railway crew work practice", Beijing, Beijing Jiaotong University Press, pp. 147-148 (2015), and English translation of relevant part, 7 pages.

Partial Translation of Office Action dated Aug. 18, 2023, from counterpart Chinese Application CN112969614.

* cited by examiner

IN-VEHICLE COMMUNICATION SYSTEM

CROSS-REFERENCE TO RELATED APPLICATIONS

This application is a U.S. national phase application filed under 35 U.S.C. § 371 of International Application Number PCT/JP2019/040827, filed Oct. 17, 2019, designating the United States, which claims priority from Japanese Patent Application Number JP 2018-223103 filed Nov. 29, 2018.

TECHNICAL FIELD

The present invention relates to an in-vehicle communication system in a compartment of a mobile object such as a railway vehicle or the like.

BACKGROUND ART

In a mobile object such as a railway vehicle, an in-vehicle installation such as a seat for a passenger to sit and a display device for displaying the next stop and/or advertisements are installed in a passenger compartment.

For example, Patent Document 1 describes that, with respect to a seat installed in a passenger compartment, an operation panel is operated to drive a motor, a solenoid or the like to rotate the seat.

Further, for example Patent Document 2 describes that a server is installed in a first vehicle, and contents such as videos are distributed from the server to the display devices of respective vehicles.

PRIOR ART DOCUMENTS

Patent Documents

Patent Document 1: JP 2016-39543 A
Patent Document 2: JP 2010-16575 A

SUMMARY OF THE INVENTION

Technical Problem

Information from the operation panel, the server and such is transmitted to the in-vehicle installation such as the seat and the display device via a wiring arranged in the vehicle. There is thus a problem that the wiring arranged in the vehicle is increased, and hence, it has been proposed to make it wireless, for example, to reduce the wiring.

In the case where radio waves are used to make it wireless, there are problems as follows. First, radio waves are likely to be radiated to the outside of the vehicle, and thus appropriate security measures must be taken to prevent inappropriate access from the outside of the vehicle. Second, since the sensitivity for radio waves may change depending on a receiving position in the passenger compartment, it is necessary to take measures for the sensitivity. Further, installing the installations for transmitting and receiving radio waves may cause an increase in cost.

Therefore, an object of the present invention is to enable communication with a vehicle installation installed in a vehicle in a manner that facilitates implementation of a security measure and with high sensitivity and at low cost.

Solution to Problem

In order to solve the above-mentioned problems, the present invention according to a first aspect provides an in-vehicle communication system including: a lighting device configured to light inside a compartment of a mobile object; and an in-vehicle installation installed inside the compartment, wherein the lighting device includes a first transmitting unit configured to transmit information to the in-vehicle installation via visible light communication, and the in-vehicle installation includes a first receiving unit configured to receive information transmitted from the lighting device, and a control unit configured to control itself based on the information received by the first receiving unit.

The present invention according to a second aspect is the invention according to the first aspect, wherein the lighting device includes a light emitting diode as a light emitting element, and the light emitting diode serves as a lighting unit for lighting inside the compartment and as the first transmitting unit.

The present invention according to a third aspect is the invention according to the first or second aspect, wherein the in-vehicle installation is a seat, and the lighting device is configured to transmit, to the seat, a command to rotate or recline the seat.

The present invention according to a fourth aspect is the invention according to the first or second aspect, wherein the in-vehicle installation is a display device, and the lighting device is configured to transmit, to the display device, content information to be displayed on the display device.

The present invention according to a fifth aspect is the invention according to the first to fourth aspects, wherein the in-vehicle installation is provided with a second transmitting unit configured to wirelessly transmit information to the lighting device, and the lighting device is provided with a second receiving unit configured to receive information transmitted by the second transmitting unit.

Advantageous Effect of the Invention

According to the present invention according to the first aspect, information can be transmitted from the lighting device to the in-vehicle installation via the visible light communication. Since an irradiated area is limited in the visible light communication, the visible light communication is strong in security and can uniformly improve the sensitivity within the area to which the light can reach. Further, since the light source of the lighting device is utilized, running cost can be reduced. Consequently, communication can be performed in a manner that facilitates implementation of a security measure and with high sensitivity and at low cost.

According to the present invention according to the second aspect, since the lighting device is composed of a light emitting diode as a light emitting element that serves as a lighting unit and as the first transmitting unit, it is possible to perform the visible light communication in addition to lighting the compartment, thereby eliminating the need to provide a separate element for the communication.

According to the present invention according to the third aspect, the lighting device transmits to the seat a command to rotate or recline the seat, thus it is possible to rotate or recline the seat via the visible light communication.

According to the present invention according to the fourth aspect, the lighting device transmits to the display device the information on contents to be displayed on the display device, thus the contents to be displayed on the display device can be changed via the visible light communication.

According to the present invention according to the fifth aspect, the in-vehicle installation is provided with the second transmitting unit configured to wirelessly transmit information to the lighting device, and the lighting device is provided with the second receiving unit configured to receive information transmitted by the second transmitting unit. Thus, information can be wirelessly transmitted from the in-vehicle installation such as the seat and/or the display device to the lighting device. Consequently, there is no need to provide wiring for transmitting information from the in-vehicle installation.

DESCRIPTION OF EMBODIMENTS

Figure 1:
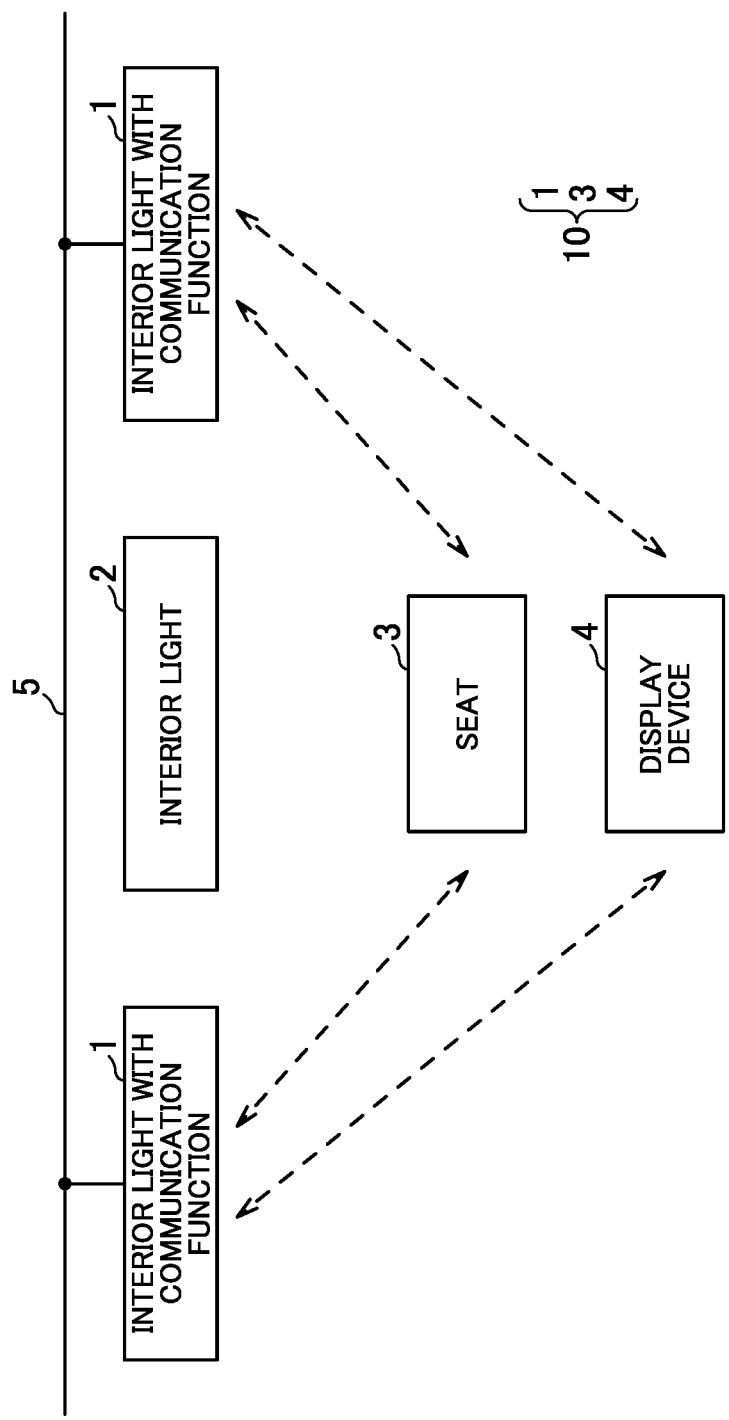
FIG. 1 is a schematic configuration diagram of an in-vehicle communication system according to one embodiment of the present invention.

In the following, one embodiment of the present invention will be described with reference to FIG. 1 to FIG. 7. FIG. 1 is a schematic configuration diagram of an in-vehicle communication system according to one embodiment of the present invention.

An in-vehicle communication system 10 includes an interior light with communication function 1 as a lighting device, and a seat 3 and a display device 4 as in-vehicle installations. The in-vehicle communication system 10 is provided in a vehicle, for example in a passenger compartment of a railway vehicle. In the following description, a railway vehicle will be described as an example of a mobile object, but the mobile object may be an aircraft, a ship, an automobile or the like.

The interior light with communication function 1 is installed in the passenger compartment of the railway vehicle and lights the interior of the vehicle, for example. Further, the interior light with communication function 1 transmits predetermined information to the seat 3 and/or to the display device 4 via visible light communication. Further, the interior light with communication function receives information from the seat 3 and/or the display device 4 via infrared light communication.

The interior light with communication function 1 is connected to a wired communication network 5. In the case of the railway vehicle, the wired communication network 5 is, for example, a communication network that uses a prearranged wiring, and information may be transmitted and received between the vehicles.

Although two interior lights with communication function 1 are shown in FIG. 1, the number thereof is not limited to two and may be one or may be three or more. However, it is preferable to provide a plurality of interior lights with communication function so as to allow the visible light communication at any position in the passenger compartment.

Further, in the passenger compartment where the in-vehicle communication system 10 is installed, an interior light 2 with no communication function may be installed as shown in FIG. 1 in addition to the interior light with communication function 1.

Figure 2:
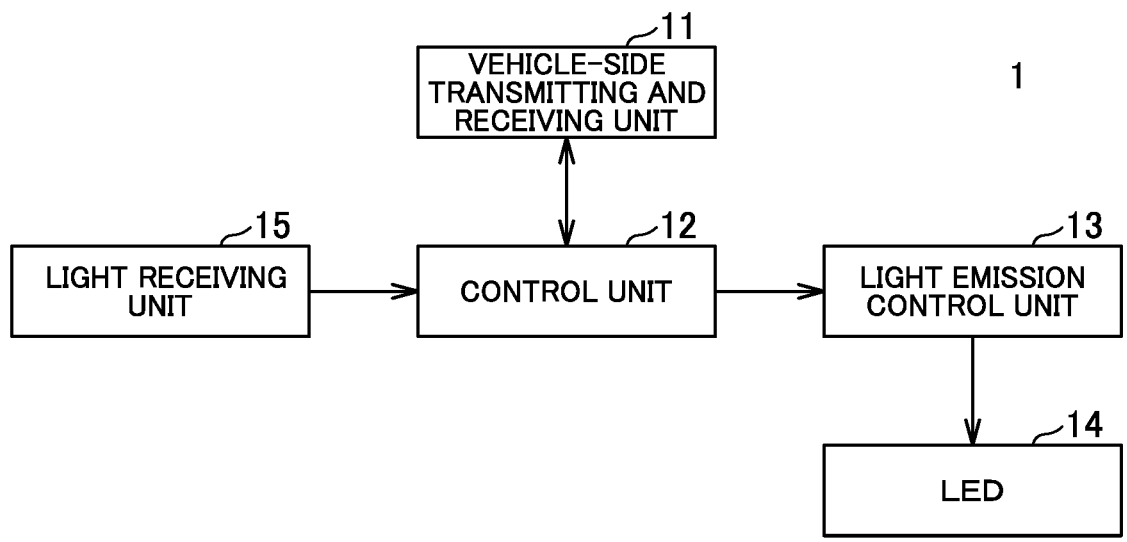
FIG. 2 illustrates a functional configuration of an interior light with communication function shown in FIG. 1.

FIG. 2 shows a functional configuration diagram of the interior light with communication function 1. The interior light with communication function 1 includes a vehicle-side transmitting and receiving unit 11, a control unit 12, a light emission control unit 13, an LED 14, and a light receiving unit 15.

The vehicle-side transmitting and receiving unit 11 communicates with the wired communication network 5, receives information transmitted from, for example, a host device installed in a first vehicle, outputs it to the control unit 12, and transmits the information outputted from the control unit 12 to the vehicle side.

The control unit 12 manages overall control of the interior light with communication function 1. The control unit 12 controls the light emission control unit 13 based on information inputted from the vehicle-side transmitting and receiving unit 11 to perform the visible light communication. Further, it produces information to be transmitted to the host device based on infrared light received by the light receiving unit 15 and outputs it to the vehicle-side transmitting and receiving unit 11.

The light emission control unit 13 controls lighting of the LED 14 by the control from the control unit 12. That is, it modulates the information to be transmitted via the visible light communication according to a predetermined modulation scheme and lights the LED 14.

The LED 14 is a light emitting diode and is a light emitting element of the interior light with communication function 1. In the case where information is transmitted by the light emission control unit 13, the LED 14 functions as a transmitting unit for the visible light communication as described above, or otherwise functions as a normal lighting unit. That is, the LED 14 functions as a first transmitting unit that transmits information to the in-vehicle installation via the visible light communication.

The light receiving unit 15 is composed of a photodiode, for example, and receives infrared light transmitted from the seat 3 and/or the display device 4. The received infrared light is converted into an electric signal and outputted to the control unit 12. That is, the light receiving unit 15 functions as a second receiving unit that receives information transmitted by a light emitting unit 36, 46 (second transmitting unit).

The seat 3 is installed in the passenger compartment of the railway vehicle, for example. The seat 3 is a known seat on which a plurality of persons can sit side by side, such as a seat for two people or a seat for three people. Further, the seat 3 can be rotated in accordance with a traveling direction of the railway vehicle so that a passenger can be seated facing the traveling direction. Further, the seat 3 is configured such that an angle of a backrest can be changed (reclined) according to the preference of the seated passenger. Although only one seat is shown in FIG. 1, it is apparent that there are provided the plurality of seats. Further, the seat 3 is not limited to a seat for plurality of persons, it may be a seat for one person.

Figure 3:
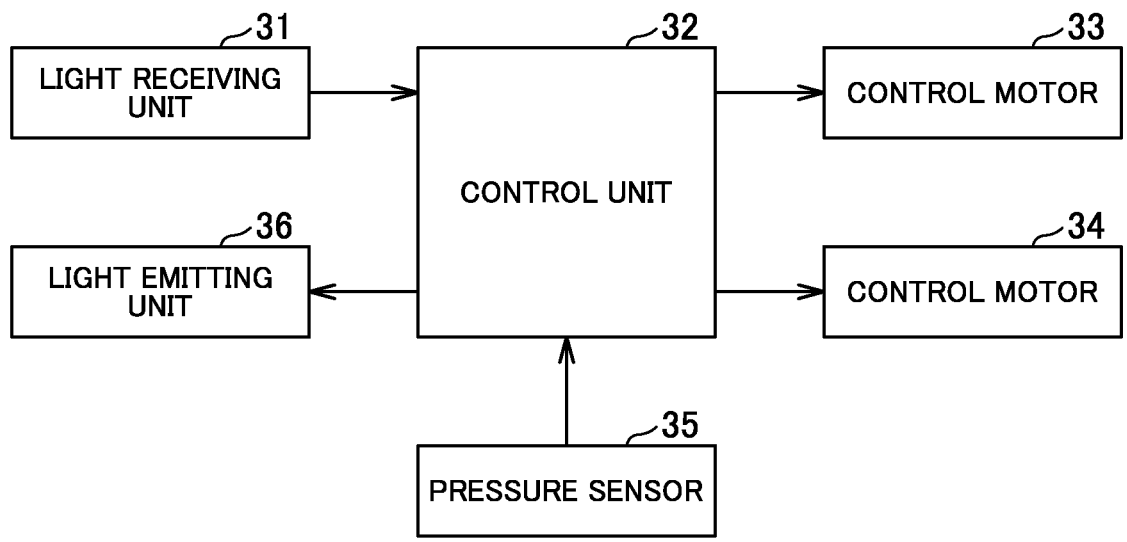
FIG. 3 illustrates a functional configuration of a seat shown in FIG. 1.

FIG. 3 shows a functional configuration diagram of the seat 3. The seat 3 includes a light receiving unit 31, a control unit 32, control motors 33, 34, a pressure sensor 35, and the light emitting unit 36.

The light receiving unit 31 is composed of a photodiode, for example, and receives visible light transmitted from the interior light with communication function 1. The received visible light is converted into an electric signal and outputted to the control unit 32. That is, the light receiving unit 31 functions as a first receiving unit that receives information transmitted from the interior light with communication function 1 (lighting device).

The control unit 32 manages overall control of the seat 3. The control unit 32 demodulates the information transmitted by the interior light with communication function 1 from the electric signal that had been converted from the visible light received by the light receiving unit 31. Then, it controls the control motors 33, 34, etc. based on the demodulated information. Further, the control unit 32 determines whether or not a passenger is seated in the seat based on an output signal of the pressure sensor 35, and transmits the determination result to the interior light with communication function 1 by the light emitting unit 36 via the infrared light communication. That is, the control unit 32 controls the operation of the seat 3 (itself) based on the information received by the light receiving unit 31 (first receiving unit).

The control motor 33 is a motor that rotates the seat 3 according to, for example, the traveling direction and the preference of the passenger. The control motor 33 rotates the seat 3 by the control from the control unit 32. The control motor 34 is a motor that reclines the backrest of the seat 3. The control motor 34 reclines the backrest by the control from the control unit 32.

The pressure sensor 35 is provided on a seat surface of the seat 3. The pressure sensor 35 outputs different signals to the control unit 32 depending on whether the passenger is seated in the seat or not.

The light emitting unit 36 is composed of a light emitting element that emits infrared light. The light emitting unit 36 is controlled by the control unit 32 to emit light so as to transmit predetermined information. That is, the light emitting unit 36 functions as a second transmitting unit that wirelessly transmits information to the interior light with communication function 1 (lighting device).

The display device 4 is installed, for example, in the vicinity of a door in the passenger compartment of the railway vehicle. The display device 4 displays, for example, a destination of this train or the next stop or an advertisement and such.

Figure 4:
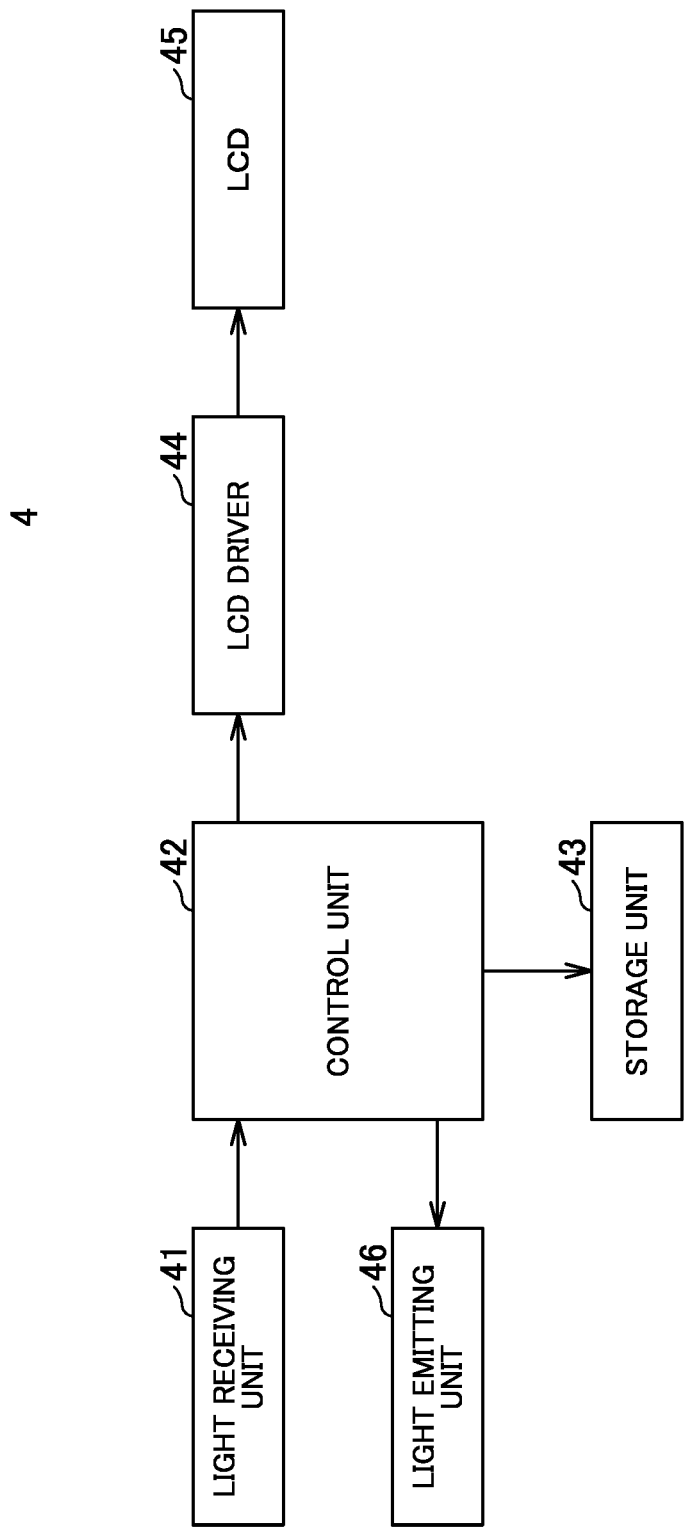
FIG. 4 is a functional configuration of a display device shown in FIG. 1.

FIG. 4 shows a functional configuration diagram of the display device 4. The display device 4 includes a light receiving unit 41, a control unit 42, a storage unit 43, an LCD driver 44, an LCD 45, and a light emitting unit 46.

The light receiving unit 41 is composed of a photodiode, for example, and receives visible light transmitted from the interior light with communication function 1. The received visible light is converted into an electric signal and outputted to the control unit 42. That is, the light receiving unit 31 functions as a first receiving unit that receives information transmitted from the lighting device.

The control unit 42 manages overall control of the display device 4. The control unit 42 demodulates the information transmitted by the interior light with communication function 1 from the electric signal that had been converted from the visible light received by the light receiving unit 41. Then, it stores the demodulated information in the storage unit 43. Then, it reads out the information stored in the storage unit 43 and causes the LCD 45 to display the information. Further, the control unit 32 transmits, for example, control information indicating the completion of the storage of information in the storage unit 43 and such to the interior light with communication function 1 by the light emitting unit 46 via the infrared light communication. That is, the control unit 42 controls the operation of the display device 4 (itself) based on the information received by the light receiving unit 41 (first receiving unit).

The information demodulated by the control unit 42 is stored in the storage unit 43. Examples of the information to be stored in the storage unit 43 include content information (i.e., destination, stops, advertisements) to be displayed on the LCD 45, control information and such for controlling the timing of display of the content information, and the like.

The LCD driver 44 is a known drive circuit that drives the LCD 45 based on the control from the control unit 42.

The LCD 45 is a known liquid crystal display and is configured to display the content information as mentioned above including destination, stops, advertisements and such. In this embodiment, the liquid crystal display is described as the display unit; however, other displays such as an organic EL may be used.

The light emitting unit 46 is composed of a light emitting element that emits infrared light. The light emitting unit 46 is controlled by the control unit 42 to emit light so as to transmit predetermined information. The light emitting unit 36 functions as a second transmitting unit that wirelessly transmits information to the interior light with communication function 1 (lighting device).

In this embodiment, the light emitting unit 46 and the light emitting unit 36 of the seat 3 are configured to emit infrared light; however, they may be configured to emit visible light. Further, it is possible to configure so as to transmit radio waves instead of using the light emitting unit 46 and the light emitting unit 36. In this case, the light receiving unit 15 of the interior light with communication function 1 is modified so as to receive radio waves. In short, it is configured so as to enable wireless transmission from the seat 3 and/or the display device 4 to the interior light with communication function 1.

Figure 5:
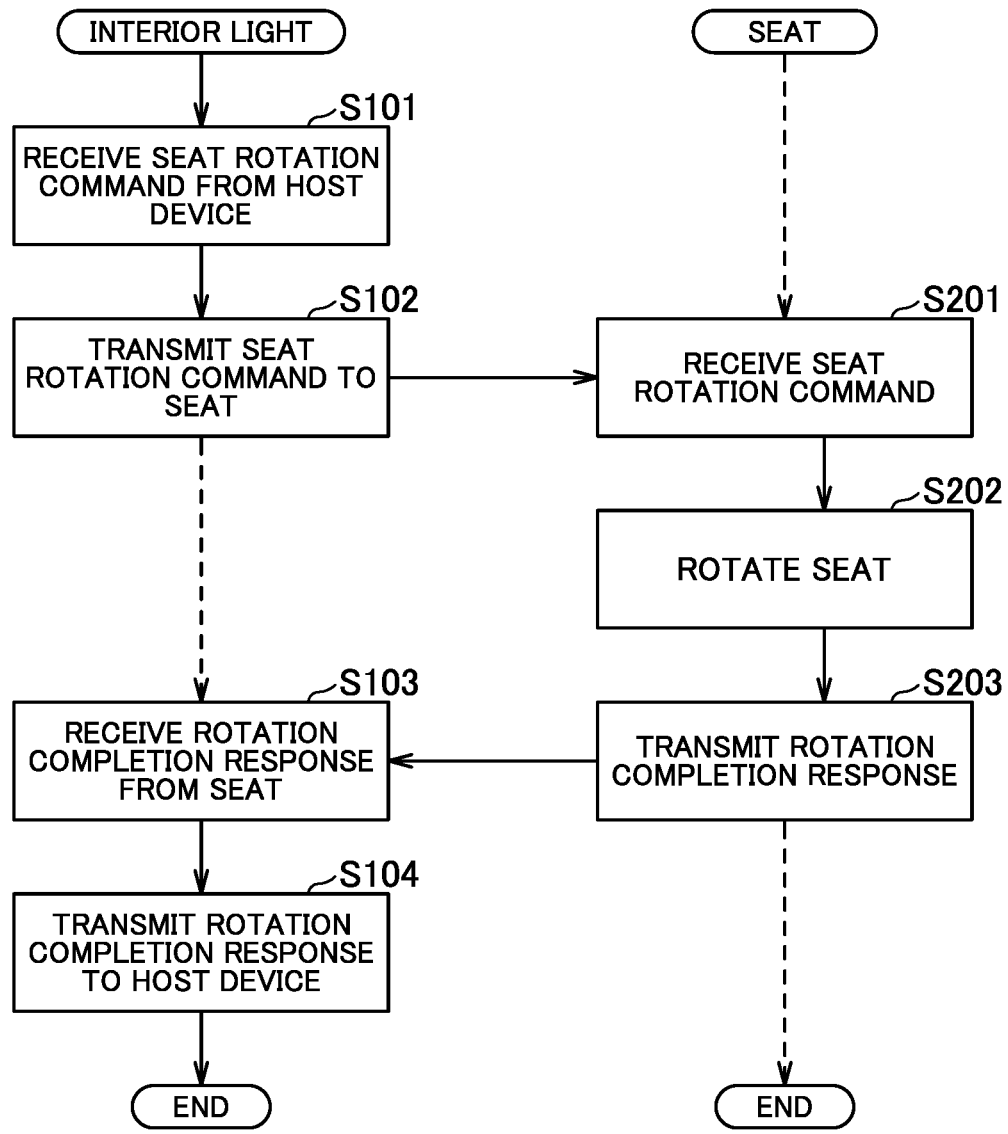
FIG. 5 is a sequence diagram of an operation for rotating the seat.
Figure 6:
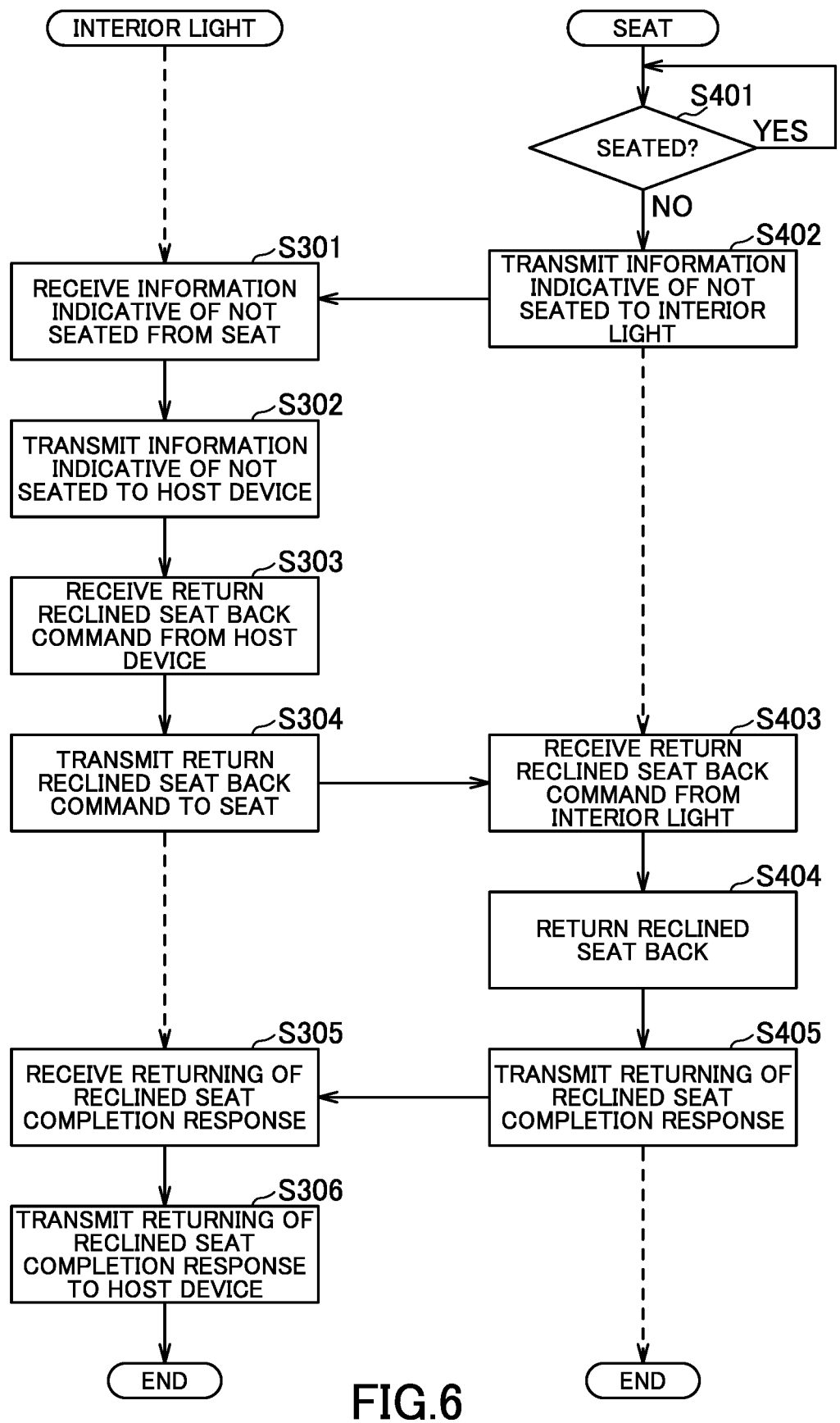
FIG. 6 is a sequence diagram of an operation for returning the reclined seat back.
Figure 7:
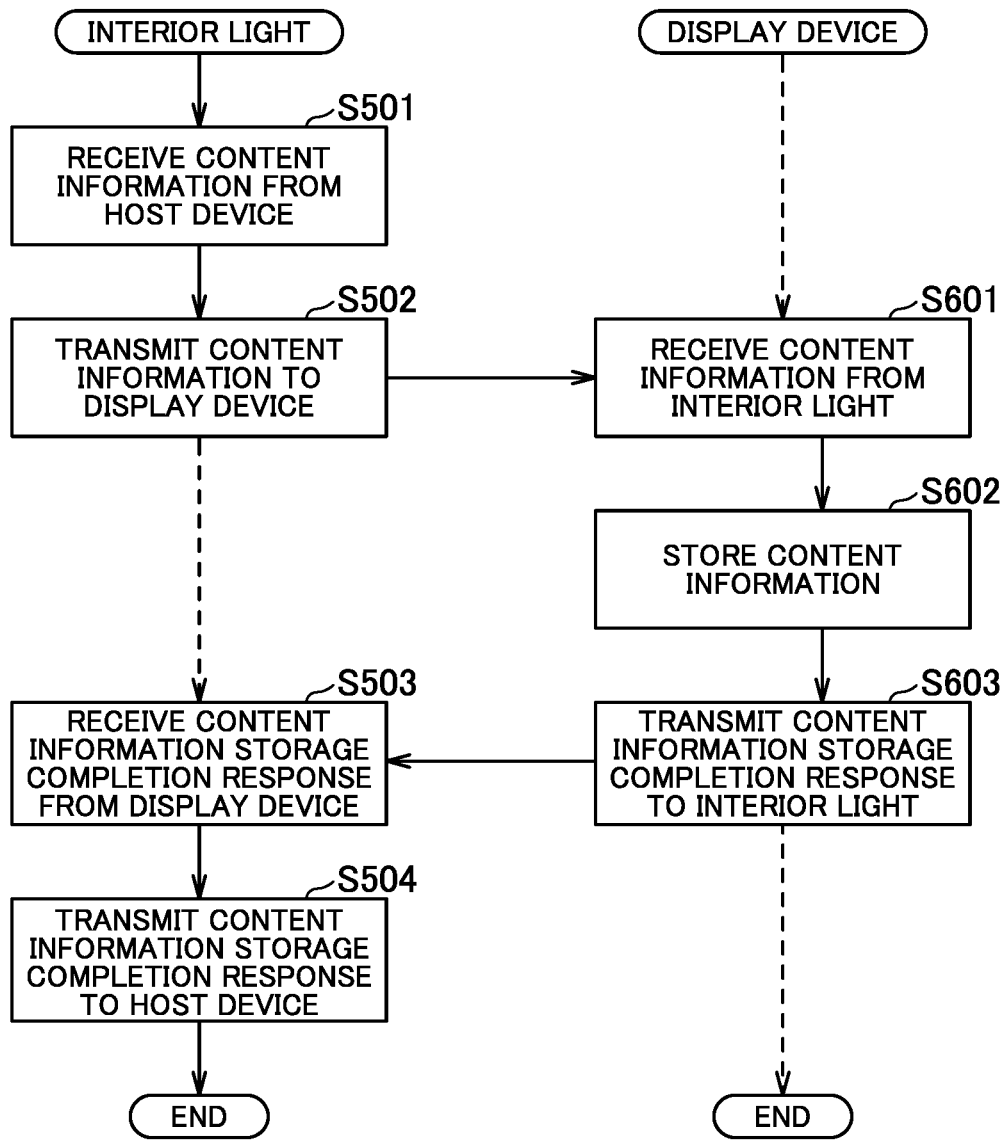
FIG. 7 is a sequence diagram of an operation for storing content information to be displayed on the display device.

Next, an operation of the in-vehicle communication system 10 having the above-described configuration will be described with reference to FIG. 5 to FIG. 7. First, an operation for rotating the seat 3 will be described with reference to the sequence diagram of FIG. 5. FIG. 5 illustrates an operation for rotating seats all at once when, for example, the railway vehicle turns back at a terminal station or the like. In FIG. 5 to FIG. 7, "interior light" indicates the interior light with communication function 1.

First, the interior light with communication function 1 receives, via the vehicle-side transmitting and receiving unit 11, a seat rotation command transmitted from the above-described host device (step S101). Then, the control unit 12 controls the light emission control unit 13 so as to transmit the received seat rotation command to the seat 3. The light emission control unit 13 then modulates the seat rotation command and lights the LED 14 to transmit it to the seat 3 by the visible light communication (step S102).

When performing the communication via the visible light communication and the infrared light communication, information may be transmitted and received after establishing a communication path by handshaking and such.

Next, the seat 3 receives the seat rotation command transmitted from the interior light with communication function 1 via the visible light communication by receiving the light by the light receiving unit 31 (step S201). Then, the control unit 32 controls the control motor 33 based on the received seat rotation command to rotate the seat 3 (step S202). Once the rotation of the seat is completed, the control unit 32 modulates a rotation completion response to cause the light emitting unit 36 to emit light to transmit it to the interior light with communication function 1 via the infrared light communication (step S203).

Next, the interior light with communication function 1 receives the rotation completion response transmitted from the seat 3 via the infrared light communication by receiving the light by the light receiving unit 15 (step S103). The control unit 12 then transmits the received rotation completion response to the host device via the vehicle-side transmitting and receiving unit 11 (step S104). FIG. 5 only illustrates the case where the rotation of the seats 3 is normally performed; however, in the event of some failure in rotating, information indicating the failure occurrence may be transmitted instead of the rotation completion response from the seat 3 to the interior light with communication function 1.

In FIG. 5, the seat rotation command corresponds to information to be transmitted to the in-vehicle installation via the visible light communication, and the rotation completion response corresponds to information to be wirelessly transmitted to the lighting device.

Next, an operation for returning the reclined seat 3 back will be described with reference to a sequence diagram of FIG. 6. FIG. 6 illustrates an operation for automatically returning the reclined seat back to a default angle after, for example, a passenger who was seated in the reclined seat gets off, or at a terminal station or the like.

First, at the seat 3, the control unit 32 determines whether or not a passenger is seated in the seat based on output from the pressure sensor 35 (step S401). As a result of the determination, if the passenger is seated, then the determination continues again (step S401: YES), or if the passenger is not seated (step S401: NO), then the control unit 32 modulates information indicative of not seated and causes the light emitting unit 36 to emit light to transmit it to the interior light with communication function 1 via the infrared light communication (step S402). In step S401, in order to distinguish from temporary leaving from the seat, it is possible to make the determination of "NO" if the passenger is not seated for a certain period of time or longer. Alternatively, the process of FIG. 6 may be executed only at a terminal station.

Next, the interior light with communication function 1 receives the information indicative of not seated transmitted from the seat 3 via the infrared light communication by receiving the light by the light receiving unit 15 (step S301). Then, the control unit 12 transmits the received information indicative of not seated to the host device via the vehicle-side transmitting and receiving unit 11 (step S302). Then, it receives, via the vehicle-side transmitting and receiving unit 11, the return reclined seat back command transmitted from the host device (step S303). The control unit 12 then controls the light emission control unit 13 so as to transmit the received return reclined seat back command to the seat 3, and, the light emission control unit 13 modulates the return reclined seat back command and lights the LED 14 to transmit it to the seat 3 via the visible light communication (step S304).

Next, the seat 3 receives the return reclined seat back command transmitted from the interior light with communication function 1 via the visible light communication by receiving the light by the light receiving unit 31 (step S403). Then, the control unit 32 controls the control motor 34 based on the received return reclined seat back command to return the reclined seat 3 back (step S404). Then, once the returning the reclined seat back is completed, the control unit 32 modulates the returning of reclined seat completion response to cause the light emitting unit 36 to emit light to transmit it to the interior light with communication function 1 via infrared light communication (step S405).

Next, the interior light with communication function 1 receives the returning of reclined seat completion response transmitted from the seat 3 via the infrared light communication by receiving the light by the light receiving unit 15 (step S305). Then, the control unit 12 transmits the received returning of reclined seat completion response to the host device via the vehicle-side transmitting and receiving unit 11 (step S306). FIG. 6 only illustrates the case where the returning the reclined seat 3 back up is normally performed; however, in the event of some failure in returning of the reclined seat, information indicating the failure occurrence may be transmitted instead of the returning of reclined seat completion response from the seat 3 to the interior light with communication function 1.

In the sequence diagram of FIG. 6, the interior light with communication function 1 receives the return reclined seat back command from the host device; however, the control unit 12 of the interior light with communication function 1 may issue the return reclined seat back command.

In FIG. 6, the return reclined seat back command corresponds to information to be transmitted to the in-vehicle installation via the visible light communication, and the information indicative of not seated and the returning of reclined seat completion response correspond to information to be wirelessly transmitted to the lighting device.

Next, an operation for storing content information to be displayed on the display device 4 will be described with reference to a sequence diagram of FIG. 7. FIG. 7 shows an operation in the event of a change in a traveling route, or in the event of an update of an advertisement, for example.

First, the interior light with communication function 1 receives content information transmitted from the host device via the vehicle-side transmitting and receiving unit 11 (step S501). This content information may contain not only purely video information of an advertisement and such, but also control information for timing of display of the video information and such. Then, the control unit 12 controls the light emission control unit 13 so as to transmit the received content information to the display device 4, and, the light emission control unit 13 modulates the content information and lights the LED 14 to transmit it to the display device 4 via the visible light communication (step S502).

Next, the display device 4 receives the content information transmitted from the interior light with communication function 1 via the visible light communication by receiving the light by the light receiving unit 41 (step S601). Then, the control unit 42 stores the received content information in the storage unit 43 (step S602). Then, once the storing of the content information is completed, the control unit 42 modulates the content information storage completion response to cause the light emitting unit 46 to emit light to transmit it to the interior light with communication function 1 via the infrared light communication (step S603).

Next, the interior light with communication function 1 receives the content information storage completion response transmitted by the display device 4 via the infrared light communication by receiving the light by the light receiving unit 15 (step S503). Then, the control unit 12 transmits the received content information storage completion response to the host device via the vehicle-side transmitting and receiving unit 11 (step S504). FIG. 7 only describes the case where the content information is successfully stored; however, in the event of some failure in storing the content information, information indicating the failure occurrence such as retransmission may be transmitted instead of the content information storage completion response information from the display device 4 to the interior light with communication function 1.

In FIG. 7, the content information corresponds to information to be transmitted to the in-vehicle installation via the visible light communication, and the content information storage completion response corresponds to information to be wirelessly transmitted to the lighting device.

According to this embodiment, in the in-vehicle communication system 10 including the interior light with communication function 1, the seat 3 and the display device 4, the interior light with communication function 1 includes the LED 14 configured to transmit information to the seat 3 and the display device 4 via the visible light communication, and the seat 3 and the display device 4 have the light receiving units 31, 41 configured to receive information transmitted from the interior light with communication function 1, and the control units 32, 42 configured to control the operation of the seat 3 and the display device 4 themselves based the information received by the light receiving units 31, 41. Thus, information can be transmitted from the interior light with communication function 1 to the seat 3 and the display device 4 via the visible light communication. Since an irradiated area is limited in the visible light communication, the visible light communication is strong in security and can uniformly improve the sensitivity within the area to which the light can reach. Further, since the light source of the interior light with communication function 1 is utilized, running cost can be reduced. Consequently, communication can be performed in a manner that facilitates implementation of a security measure and with high sensitivity and at low cost.

Further, since the interior light with communication function 1 is composed of a light emitting diode as a light emitting element that serves a lighting unit and as the first transmitting unit, it is possible to perform the visible light communication in addition to lighting the compartment, thereby eliminating the need to provide a separate element for communication.

Further, since the interior light with communication function 1 transmits to the seat 3 the command to rotate or recline the seat 3, it is possible to rotate or recline the seat 3 via the visible light communication.

Further, since the interior light with communication function 1 transmits to the display device 4 the information of contents to be displayed on the display device 4, contents to be displayed on the display device 4 can be replaced via the visible light communication.

Further, the seat 3 and the display device 4 are provided with the light emitting units 36, 46 configured to transmit information using infrared rays to the interior light with communication function 1, and the interior light with communication function 1 is provided with the light receiving unit 15 configured to receive information transmitted by the light emitting units 36, 46. Thus, information can be wirelessly transmitted from the seat 3 or the display device 4 to the interior light with communication function 1. Consequently, there is no need to provide wiring for transmitting information from the seat 3 and the display device 4.

The present invention is not limited to the embodiments described above. That is, various modifications can be made and implemented without departing from the gist of the present invention based on conventionally known knowledges, and, of course, still fall within the scope of the present invention as long as they include configuration of the in-vehicle communication system of the present invention.

LIST OF REFERENCE SIGNS

1 interior light with communication function (lighting device)
3 seat (in-vehicle installation)
4 display device (in-vehicle installation)
12 control unit
14 LED (first transmitting unit)
15 light receiving unit (second receiving unit)
31 light receiving unit (first receiving unit)
32 control unit
36 light emitting unit (second transmitting unit)
41 light receiving unit (first receiving unit)
42 control unit
46 light emitting unit (second transmitting unit)

The invention claimed is:

1. An in-vehicle communication system comprising:
a lighting device configured to light inside a passenger compartment of a railway vehicle; and
a plurality of seats installed inside the passenger compartment, wherein
the lighting device includes a first light-emitting element configured to transmit a command of rotating the plurality of seats all at once or a command of returning reclined seats back to a default angle after passengers get off or when arriving at a terminal station to the plurality of seats via visible light communication, and
each of the plurality of seats includes a first light-receiving element configured to receive the command transmitted from the lighting device, and a control unit configured to rotate seats or return the reclined seats back to the default angle based on the command received by the first light-receiving element.

2. The in-vehicle communication system according to claim 1, wherein
the lighting device includes a light emitting diode as a light emitting element, and
the light emitting diode serves as a lighting unit for lighting inside the passenger compartment and as the first light-emitting element.

3. The in-vehicle communication system according to claim 1, wherein
the plurality of seats is provided with a second light-emitting element configured to wirelessly transmit information to the lighting device, and
the lighting device is provided with a second light-receiving element configured to receive information transmitted by the second light-emitting element.

* * * * *